US012656818B2

(12) United States Patent
Hung et al.

(10) Patent No.: US 12,656,818 B2
(45) Date of Patent: Jun. 16, 2026

(54) MULTI-NODE ELECTRONIC DEVICE

(71) Applicant: Apple Inc., Cupertino, CA (US)

(72) Inventors: Li-Tyng Hung, Fremont, CA (US);
Maegan K. Spencer, Emerald Hills,
CA (US); Albert Wang, Sunnyvale, CA
(US); Salome Bavetta, San Jose, CA
(US); Lindsay M. Epstein, San
Francisco, CA (US); Wing Shan Wong,
Woodside, CA (US); **Wegene H.
Tadele**, San Francisco, CA (US);
Michael A. Kinney, San Francisco, CA
(US); Aaron N. Miletich, Lodi, CA
(US)

(73) Assignee: Apple Inc., Cupertino, CA (US)

( * ) Notice: Subject to any disclaimer, the term of this
patent is extended or adjusted under 35
U.S.C. 154(b) by 192 days.

(21) Appl. No.: 18/746,824

(22) Filed: Jun. 18, 2024

(65) Prior Publication Data

US 2025/0004502 A1     Jan. 2, 2025

Related U.S. Application Data

(60) Provisional application No. 63/523,737, filed on Jun.
28, 2023.

(51) Int. Cl.
G06F 1/16          (2006.01)
(52) U.S. Cl.
CPC .................................... G06F 1/163 (2013.01)
(58) Field of Classification Search
CPC ...................................................... G06F 1/163
See application file for complete search history.

(56) References Cited

U.S. PATENT DOCUMENTS

| 5,211,321 | A | * | 5/1993 | Rodriguez | ................ | A45F 5/00 |
| | | | | | | 224/604 |
| 5,285,398 | A | * | 2/1994 | Janik | ....................... | G06F 1/163 |
| | | | | | | D14/300 |
| 5,302,806 | A | * | 4/1994 | Simmons | ............... | A42B 3/285 |
| | | | | | | 607/108 |
| 5,416,730 | A | * | 5/1995 | Lookofsky | .............. | G06F 1/163 |
| | | | | | | 361/679.02 |
| 5,491,651 | A | * | 2/1996 | Janik | ....................... | G06F 1/163 |
| | | | | | | 361/679.55 |
| 5,555,490 | A | * | 9/1996 | Carroll | .................... | G06F 1/163 |
| | | | | | | 2/905 |

(Continued)

*Primary Examiner* — Lisa Lea-Edmonds
(74) *Attorney, Agent, or Firm* — Brownstein Hyatt Farber
Schreck, LLP

(57)          ABSTRACT

Embodiments are directed to wearable electronic devices
including a band having a flexible layer and a routing layer
coupled to the flexible layer. The routing layer including one
or more electrical traces. A first enclosure is coupled to the
band at a first opening and includes a first upper enclosure
segment coupled to a first side of the band and a first lower
enclosure segment coupled to a second side of the band. A
processing unit is enclosed within the first enclosure and
electrically coupled to the routing layer. A second enclosure
is coupled to the band at a second opening and includes a
second upper enclosure segment coupled to the first side of
the band and a second lower enclosure segment coupled to
the second side of the band. A battery is enclosed within the
second enclosure and electrically coupled to the processing
unit via the routing layer.

20 Claims, 15 Drawing Sheets

(56)                References Cited

U.S. PATENT DOCUMENTS

| | | | | | |
|---|---|---|---|---|---|
| 5,572,401 | A | * | 11/1996 | Carroll | G06F 1/163 |
| | | | | | 429/127 |
| 5,581,492 | A | * | 12/1996 | Janik | G06F 1/163 |
| | | | | | D14/300 |
| 5,774,338 | A | * | 6/1998 | Wessling, III | G06F 1/163 |
| | | | | | 361/733 |
| 6,307,751 | B1 | * | 10/2001 | Bodony | G06F 1/163 |
| | | | | | 361/679.08 |
| 6,356,437 | B1 | * | 3/2002 | Mitchell | G06F 1/163 |
| | | | | | 361/730 |
| 6,529,372 | B1 | * | 3/2003 | Ng | G06F 1/163 |
| | | | | | 361/728 |
| 6,956,614 | B1 | * | 10/2005 | Quintana | H04N 7/185 |
| | | | | | 348/373 |
| 6,962,277 | B2 | * | 11/2005 | Quintana | G06F 1/163 |
| | | | | | 709/201 |
| 7,618,260 | B2 | * | 11/2009 | Daniel | A44C 5/0007 |
| | | | | | 439/528 |
| 7,624,453 | B2 | * | 12/2009 | Rene | G06F 1/163 |
| | | | | | 2/2.5 |
| 7,764,488 | B2 | * | 7/2010 | Calvarese | G06F 1/163 |
| | | | | | 361/679.03 |
| 8,099,794 | B2 | * | 1/2012 | Carstens | G06F 1/163 |
| | | | | | 2/311 |
| 8,786,246 | B2 | * | 7/2014 | Tsui | H02J 7/61 |
| | | | | | 320/112 |
| 9,645,610 | B1 | * | 5/2017 | Chang | H05K 3/361 |
| 10,474,192 | B2 | * | 11/2019 | Song | G04G 17/04 |
| 10,595,618 | B2 | * | 3/2020 | Wang | H04M 1/724092 |
| 2006/0177086 | A1 | | 8/2006 | Rye et al. | |
| 2014/0070957 | A1 | * | 3/2014 | Longinotti-Buitoni | |
| | | | | | G06F 1/163 |
| | | | | | 340/870.01 |
| 2014/0078694 | A1 | * | 3/2014 | Wissmar | A61B 5/681 |
| | | | | | 361/749 |
| 2015/0342525 | A1 | * | 12/2015 | Justice | A61B 5/681 |
| | | | | | 600/407 |
| 2018/0092443 | A1 | * | 4/2018 | Albers | A44C 5/105 |
| 2019/0251808 | A1 | | 8/2019 | Wheeler et al. | |
| 2025/0004502 | A1 | * | 1/2025 | Hung | G06F 1/163 |

* cited by examiner

110

900

904        902        904

E-E 904    903    902    903    906    904

908

1100

1110

1200

MULTI-NODE ELECTRONIC DEVICE

CROSS-REFERENCE TO RELATED APPLICATION(S)

This application is a nonprovisional patent application of and claims the benefit of U.S. Provisional Patent Application No. 63/523,737, filed Jun. 28, 2023 and titled "Multi-Node Electronic Device," the disclosure of which is hereby incorporated herein by reference in its entirety.

FIELD

The described embodiments relate generally to wearable electronic devices. More particularly, the present embodiments relate to wearable electronic devices that include physiological sensors.

BACKGROUND

Wearable electronic devices such as a smartwatch can have a housing and a band that attaches the housing to a user. The housing may contain or at least partially contain a display, electronic components, a battery, input/output devices, physiological sensors and so on. In many cases the size and shape of the housing is based on the arrangement of the components that are contained within the housing.

SUMMARY

Embodiments are directed to a wearable electronic device that includes a multilayered band having a flexible layer defining multiple openings and a routing layer coupled to the flexible layer and extending through the one or more openings, where the routing layer includes one or more electrical traces. A first assembly can be coupled to the multilayered band at a first opening of the multiple openings. The first assembly can include a first upper enclosure segment coupled to a first side of the multilayer band, a first lower enclosure segment coupled to a second side of the multilayered band and a processing unit can be enclosed within the first enclosure, positioned at least partially within the first opening and electrically coupled to the routing layer. A second assembly can be coupled to the multilayered band at a second opening of the multiple openings. The second assembly can include a second upper enclosure segment coupled to the first side of the multilayered band, a second lower enclosure segment coupled to the second side of the multilayered band and a battery can be enclosed within the second enclosure, positioned at least partially within the second opening and electrically coupled to the processing unit via the routing layer.

Embodiments are also directed to wearable electronic devices that include a flexible band having a flexible layer. A first substrate can be coupled to a first portion of the flexible layer, where the first substrate defines a first rigid segment along the flexible band. A second substrate can be coupled to a second portion of the flexible layer, where the second substrate defines a second rigid segment along the flexible band. A third substrate can be coupled to a third portion of the flexible layer, where the third substrate defines a third rigid segment along the flexible band. The flexible band can include electrical traces coupled to the flexible layer and extending between the first, second and third substrates. A processing unit can be coupled to the first substrate, a battery can be coupled to the second substrate, and a sensor can be coupled to the third substrate. The wearable electronic device can include multiple enclosures each having an upper enclosure segment positioned at a first side of the flexible band and a lower enclosure segment positioned at a second side of the flexible band. The multiple enclosures can include a first enclosure containing the processing unit, a second enclosure containing the battery and a third enclosure containing the sensor.

Embodiments are further directed to a wearable electronic device that includes a first flexible band having a first set of electrical traces, where the first flexible band is configured to encircle at least a portion of a user's wrist. The wearable electronic device can include a second flexible band having a second set of electrical traces, where the second flexible band is configured to encircle at least the portion of the user's wrist and offset from the first flexible band. A first set of enclosures can be coupled to the first flexible band, and the first set of enclosures can include a first enclosure containing a first electronic component coupled to the first set of electrical traces and a second enclosure containing a second electronic component coupled to the first set of electrical traces. A second set of enclosures can be coupled to the second flexible band, and the second set of enclosures can include a third enclosure containing a third electronic component coupled to the second set of electrical traces and a fourth enclosure containing a fourth electronic component coupled to the second set of electrical traces. A connector can electrically couple the first set of electrical traces to the second set of electrical traces, where one of the first, second, third or fourth electronic components include a processing unit that is configured to control operation of the other electronic components.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
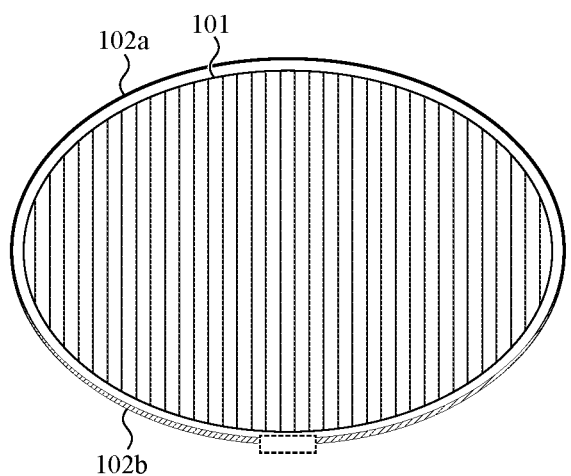
FIG. 1A shows an example of a wearable electronic device being worn by a user.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to wearable electronic devices that include a band and multiple enclosures coupled to the band. Each enclosure can contain a discrete electronic component of the wearable electronic device. For example, a first enclosure can contain processing circuitry, which may be implemented as an integrated processing unit, a second enclosure can contain a battery, a third enclosure may contain memory, a fourth enclosure may include communication circuitry (e.g., wireless communication circuitry), and one or more additional enclosures may each include a different type of sensor (e.g., movement sensor, temperature sensor, other physiological sensors, and so on). The band may include electrical connections that electrically couple the electronic components contained in each of the different enclosures. The band may be flexible allowing the wearable device to bend, flex or otherwise conform around a user. The enclosure segments may be more rigid than the band. Accordingly, the electronic device may include flexible band portions that extend between more rigid enclosure segments.

Each enclosure and respective electronic device may also be referred to as a node or a module of the wearable electronic device and a node (or module) can represent a discrete functional unit that is separated from but electrically coupled to other nodes which operate together to perform functions of the electronic device. For example, nodes may be separated by flexible band segments thereby physically separating and allowing relative movement between different functional units of the electronic device. Various examples of node structures are discussed herein, however these are provided for illustrative purposes and other arrangement of nodes along one or more bands are possible.

The size and shape of each enclosure may be based on the electronic component that is contained within a respective enclosure. Accordingly, different enclosures may have different sizes and shapes. In some cases, a discrete number of different enclosure sizes and shapes may be defined, for example based on the smallest and largest electronic components, and each electronic component may be enclosed in one of the defined enclosures. For example, a wearable electronic device can include four different enclosure profiles (i.e., size and shape) and each electronic component may be enclosed in one of the four different enclosure profiles. However, this is just one non-limiting example, and any number of different enclosure profiles can be used. For example, a single enclosure profile can be used, and each electronic component can be housed in an enclosure that is the same size and shape as the other enclosures. In other cases, the size and shape of the enclosure may be used to indicate an electronic component that is contained within the enclosure. For example, an enclosure for a processing circuit can have a first profile (e.g., first size and shape), an enclosure for a battery can have a second profile (e.g., size and shape) and so on, where each size and shape are unique to the enclosed electronic component.

As used herein the term "electronic component" refers to one or more discrete components that perform one or more dedicated functions. For example, an electronic component may be a processing circuit which controls operation of the electronic device. Another electronic component may be a power source (e.g., battery), which provides power to various other components of the electronic device; another electronic component may be memory; another electronic component may include communication circuitry such as wireless communication circuitry (e.g., near-field communications (NFC) circuit(s), Bluetooth communications circuit(s), Wi-Fi circuit(s), cellular communications circuit(s), and so on); other electronic components may include sensors such as one or more movement sensors (e.g., an inertial measurement unit (IMU); an accelerometer, a gyroscope, an altimeter, and so on), one or more physiological sensors (e.g., a temperature sensor, heart rate sensor, optical sensors such as photoplethysmography (PPG) sensor, electrocardiogram (ECG) sensor, galvanic skin sensor and so on); another electronic component can include one or more input or output units such as a display, touch-sensitive display, speaker, microphone, haptic output unit, and so on; and/or other suitable electronic units.

The band, the enclosures and the electronic components may be coupled together to form an integrated wearable electronic device. Accordingly, the wearable electronic device may include multiple electronic components, each housed in different enclosures, that all operate together to perform one or more functions. For example, the processing unit (contained in a first enclosure) may communicate with a battery (contained in a second enclosure), memory (contained in a third enclosure), a movement sensor (contained in a fourth enclosure) and a communications module (contained in a fifth enclosure) to measure movement of a user and send the measured movement data to one or more other electronic devices such as a smartphone, a tablet, a laptop computer, a desktop computer, to cloud-based storage, or any other suitable electronic device.

The wearable electronic device can have multiple housings that are each coupled together by the band. These housing segments may be smaller than a housing for an electronic device that has a single housing that contains all of the electronic components. For example, traditional wearable electronic devices that support multiple functions in a single housing can be quite larger, resulting in user discomfort and/or undesirable aesthetics. The discrete enclosures of the wearable electronic devices described herein may allow component to be spread out among multiple enclosures that allow for smaller housings, can have flexibility between components and/or doesn't appear to be a specific type of electronic device. For example, the enclosures can be configured with different aesthetic designs and/or covered with different materials such as various polymers, textiles and so on.

The band may integrate with each of the enclosures to form a sealed system that contains each of the electronic components. The band can be a multi-component band that has different components that each perform a different function(s). For example, the band can be a multilayered band and each different layer may perform a different function(s). A first layer may be a flexible/compliant layer that allows the band to bend, stretch or otherwise deform around a user when the device is worn by the user. The flexible layer can also interface with each enclosure to form a sealed system around an electronic component contained within a respective enclosure.

In some case the flexible layer may include one or more openings and each electronic component may be positioned within an opening in the flexible layer. For example, each electronic component may extend through a respective opening in the flexible layer. Each enclosure may include an upper enclosure segment positioned on a first side of the band and a lower enclosure segment positioned on a second side of the band. The upper and lower enclosure segments may couple together to create a sealed enclosure with the band. For example, the upper and lower enclosure segments may sandwich around the band and be sealed to the flexible layer. A respective opening defined in the flexible layer can be contained within the enclosure and a respective electronic component may be positioned within the opening and contained within a cavity defined by the enclosure segments and the band.

The multi-layered band may also include a routing layer which has electrical traces that electrically couple the different electronic components of the wearable electronic device. The routing layer may be coupled to the flexible layer and extend across or otherwise be routed through the enclosure and electrically coupled to a respective electronic component contained within each different enclosure. In some cases, a single continuous routing layer may extend between each of the different enclosures. In other cases, multiple routing layers may be used. In other examples, multiple discrete routing segments may be used to couple the various different electronic components. For example, a different routing component may couple each different electronic component to a processing unit. Each of these different routing components may be on a same layer of the band and/or different layers of the band.

In some cases, the band can include one or more antennas (e.g., near-field communication (NFC) antenna(s), Bluetooth antenna(s), Wi-Fi antenna(s), and/or traces that are configured with antenna functionality). The antennas may be integrated with one or more layers of the band. For example, an antenna can be formed in the routing layer or additional layer and include electrical traces (and/or other electrical components) that are configured to operate as a specific type of antenna. Additionally or alternatively, the band may include charging functionality, such as electric contacts that are electrically coupled to one or more batteries of the device and are configured to supply electrical power to the battery(ies).

In some cases, the band may include one or more reinforcing layers, which may help protect electrical traces on the routing layer from damage. For example, the one or more reinforcing layers may include materials that can bend or flex, but limit extension of the band. In these examples, the reinforcing layer may be configured to allow a defined amount of extension, bending or other deformation, which may allow the band to bend, flex or otherwise deform around a user, while protecting electrical traces from damage.

In some cases, the enclosures may include features that interface with the band and/or a respective electrical component, which define a mounting configuration of the band and/or electrical component with respect to the enclosure. For example, an enclosure may include one or more posts and one or more layers of the band (e.g., routing layer and reinforcing layer) may couple with the post to secure the band to the enclosure. Additionally or alternatively, an electronic component may couple to one or more features (e.g., a post) to secure the electronic component to the enclosure. In some cases, the electronic component can be coupled to the enclosure using other suitable techniques including adhesives, welding, integrated assembly methods (e.g., lithographic techniques), additive manufacturing, and so on.

The enclosures may be arranged in various different configurations with respect to each other. For example, in some cases, a wearable electronic device may include a single band and each enclosure may be positioned in a row along the single band. In some cases, the location of each electronic component may be based on the function of that respective component. For example, a processing unit may interface with each of the other electronic components and therefore be positioned centrally with respect to the other components. A battery may be positioned next to the processing unit, for example on a first side of the processing unit and memory may be positioned on a second side of the processing unit. One or more sensors may be positioned more peripherally along the band and perform a dedicated sensing function and may only communicate with a subset of the electronic components of the wearable electronic device (e.g., the processing unit and the battery). In other examples, the wearable electronic device may include multiple bands and various electronic components may be located on different ones of the band. The different bands and/or electronic components may be electrically coupled together.

In some cases, one or more temperature sensors are integrated with the band and/or the enclosure(s), and can be operated to determine a temperature of a user. In some examples, a first temperature sensor can be placed on an inner surface of the band (or enclosure) and may be configured to measure a body temperature of a user when the device is worn. A second temperature sensor can be placed on an outer surface of the band (or enclosure) and may measure an ambient temperature. The device may be operated to determine a body temperature of a user based on the measurements from the first and/or second temperature sensors (e.g., based on heat flux). In other examples, a first temperature sensor may be positioned at a first location of the band (e.g., located on a first side of a limb when the device is worn) and a second temperature sensor may be positioned at a second location of the band (e.g., located on a opposite side of the limb when the device is worn). The device may determine a temperature of a user based on the first and second temperature sensors (e.g., based comparing/combining measurements from different sensors, on heat flux, an empirical model, and so on).

In some cases, the wearable electronic device can include enclosures that are partially or fully covered by the band. The band can include a flexible outer component and a support that is coupled to adjacent enclosures. The support can have a first end coupled to a first enclosure and a second end coupled to a second enclosure. In some cases, the support is flexible and can flex/elastically deform to allow movement between the first enclosure and the second enclosure. In other cases, the support may be rigid and have minimal or no flex under typical use conditions. The flexible outer component can be formed around the support and the enclosures. In some cases, the flexible outer component can be molded or otherwise applied over the support, the enclosures and/or other components and fully or partially surround one or more of these components.

The wearable electronic device includes a routing layer which has electrical traces that electrically couple a first electronic component to a second electronic component. The routing layer may be coupled to the support and extend across or otherwise be routed between the enclosures and electrically coupled to a respective electronic component contained within each different enclosure.

In other cases, the wearable electronic device includes a band that is formed from cable or ribbon-style electrical connectors that electrically and mechanically couple the different enclosures. The band can include one or more segments that include a first end, which is coupled to the first enclosure and a second end, which is coupled to the second enclosure. The ends may be coupled to their respective enclosures using any suitable processes including potting and adhesive materials, which may both seal an end of the cable to a respective enclosure and provide mechanical retention of the end of the cable within the respective enclosure.

These and other embodiments are discussed below with reference to FIGS. 1-12. However, those skilled in the art will readily appreciate that the detailed description given herein with respect to these Figures is for explanatory purposes only and should not be construed as limiting.

FIG. 1A shows an example of a wearable electronic device 102 being worn by a user 101. The wearable electronic device 102 may be an example of the wearable devices described herein and include a band and one or more enclosures coupled to the band, where each enclosure contains a different electrical component. The wearable electronic device 102 can be configured to be worn around a limb of a user 101, such as around a user's wrist or other portion of a user's arm. For example, the wearable device can be configured as a band that completely or partially encircles a limb of the user 101. In other cases, the wearable electronic device 102 can be configured as other types of wearable devices, such as a device that can be worn around a neck of the user 101 (e.g., as a necklace), around a head of the user 101 (e.g., as a head band), around a torso region of the user 101, around a lower limb of the user 101, and/or worn in other locations on the user's 101 body. In other examples, the wearable electronic device 102 may be integrated into clothing or other wearables. For example, the enclosures and band can be integrated into fabrics, which are used for pants, shirts and so on.

In some cases, the wearable electronic device 102 is flexible and can conform to a portion of the user's body. The wearable electronic device 102 may include different portions that have different properties. For example, a first portion 102a of the wearable electronic device 102 may include the one or more enclosures and electronic components and be configured to resist or limit extension (e.g., have a higher modulus of elasticity, higher rigidity, and so on) to help protect electrical traces that are routed along the first portion 102a. A second portion 102b of the wearable electronic device 102 may be configured to more easily extend/stretch to allow the device to conform to a user or be placed on different portions of the user. For example, if the wearable electronic device 102 is configured to be worn around a wrist of the user, the second portion 102b may elongate to a greater extent than the first portion 102a to allow the wearable electronic device 102 to pass over the user's hand.

Additionally or alternatively, the first portion 102a and the second portion 102b may contract around a portion of the user to securely couple the wearable electronic device against the user 101 and prevent movement between the wearable electronic device 102 and the user 101. For example, the circumference of the wearable electronic device 102 may be smaller than a circumference of a wrist of the user 101 and the first portion 102a (to a lesser degree) and the second portion 102b (to a greater degree) may be in an elongated state when worn around the writs of the user 101 and exert an elastic force the secures the wearable electronic device 102 to the user 101. In other cases, the wearable electronic device 102 (or a portion of the wearable electronic device) may be sized to be larger than a portion of the user's body and may be worn loosely around a portion of the user 101.

In some embodiments, the wearable electronic device 102 may include a clasp or other fastening mechanism that joins two or more portions of the wearable electronic device 102 to form a configuration that can extend around a body part of the user 101. For example, a clasp may join two ends of the electronic device 102 and may allow the wearable electronic device 102 to be secured around a wrist (or other body part) of the user 101 and removed from the wrist of the user 101.

Figure 1B:
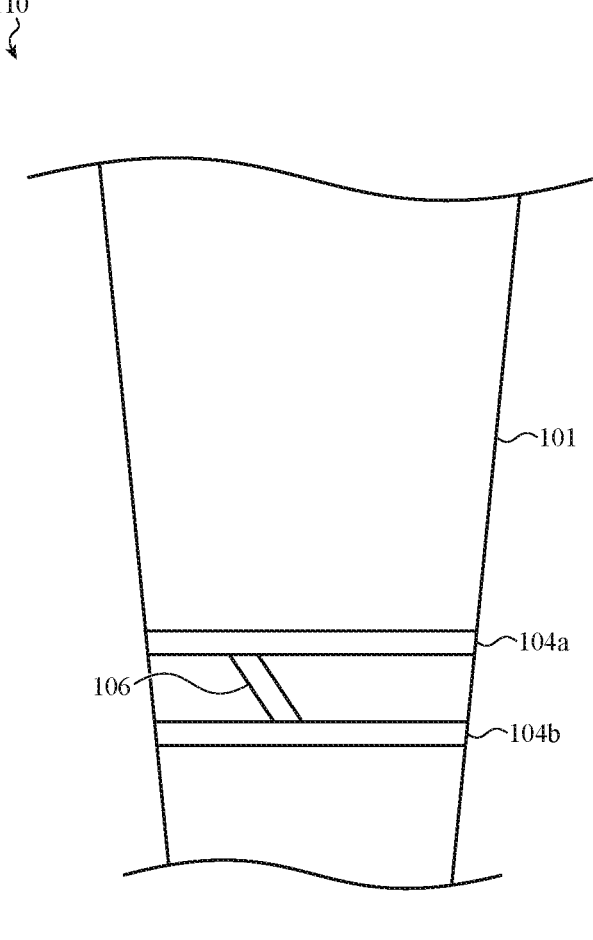
FIG. 1B shows an example of a wearable electronic device being worn by a user.

FIG. 1B shows an example of a wearable electronic device 110 being worn a user 101. The wearable electronic device 110 may include multiple bands 104 and each band 104 may include one or more enclosures that contain a respective electronic component. For example, the wearable electronic device 110 may include a first band 104a and a second band 104b. The first band 104a may include a first set of enclosures and the second band 104b may include a second set of enclosures. The enclosures may be arranged in any suitable configuration. For example, the first band 104a may include a first enclosure that contains a processing unit, a second enclosure that contains a battery and a third enclosure that contains memory. The processing unit, battery and memory may be electrically coupled by traces routed along the first band 104a, as described herein. The second band 104b may include a fourth enclosure that contains a communications module (e.g., NFC circuit), a fifth enclosure that contains a movement sensor (e.g., IMU) and a sixth enclosure that includes a temperature sensor. The communications module, the movement sensor and the temperature sensor may be electrically coupled by traces routed along the second band 104b as described herein.

The wearable electronic device 110 may include a connector 106 that electrically couples one or more of the electronic components on the first band 104a to one or more of the electronic components on the second band 104b. In some cases, the connector 106 may couple the first band 104a to the second band 104b and include routing traces that run between the first band 104a and the second band 104b. In other cases, the connector 106 may be routed directly from a first electronic component on the first band 104a (e.g., the processing circuit) and to an electronic component on the second band (e.g., the movement sensor). In some cases, the wearable electronic devices can include additional bands and/or connectors (not shown) that are used to electrically couple additional electronic components. For example, a fourth connector could be routed between the processing unit on the first band 104*a* and the communications module on the second band 104*b*.

The bands described herein are primarily shown as flat bands that include multiple layers. However, other band configurations are possible. For example, one or more bands can be configured as cylindrical bands. In these cases, the layers may be cylindrical layers that extend radially through the band. The concepts described herein can readily be applied to bands having different shapes such as cylindrical, semi-circular, and/or other shapes.

Figure 2A:
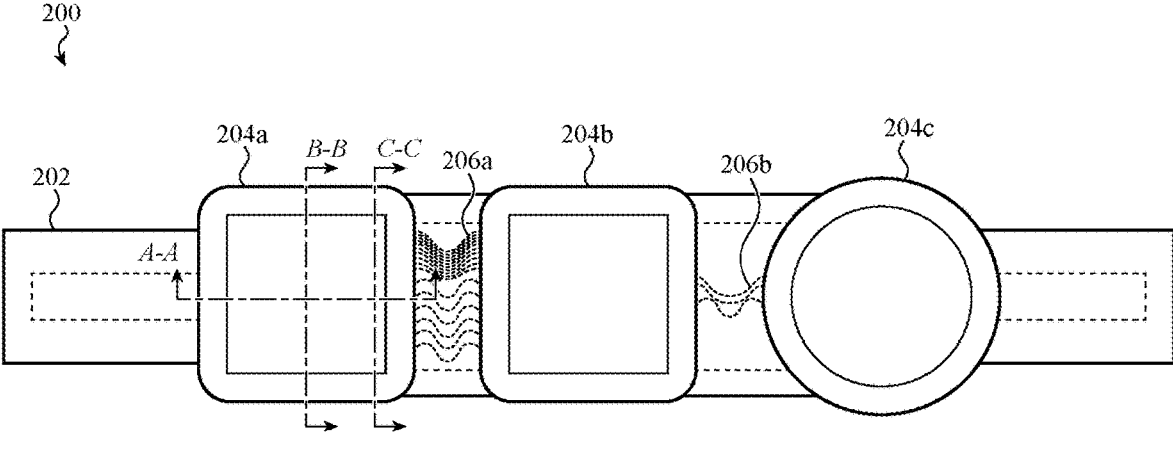
FIG. 2A shows a top view of an example wearable electronic device.

FIG. 2A shows a top view of an example wearable electronic device 200. The wearable electronic device 200 can be an example of the wearable electronic devices described herein and include a band 202 and multiple enclosures 204 that each contain one or more electronic components.

The band 202 can be configured to wrap around a limb of a user to secure the wearable electronic device 200 to the user. The band can be flexible and include electrical traces 206 that electrically couple different electronic components. For example, the band 202 may include a first set of electrical traces 206*a* that extend between a first enclosure 204*a* and a second enclosure 204*b*. The first set of electrical traces 206*a* may electrically couple one or more electronic components contained within the first enclosure 204*a* to one or more electronic components contained within the second enclosure 204*b*. The band 202 can also include a second set of electrical traces 206*b* that extend between the second enclosure 204*b* and a third enclosure 204*c*. The second set of electrical traces 206*b* may electrically couple one or more electronic components contained within the second enclosure 204*b* to one or more electronic components contained within the third enclosure 204*c*.

In some cases, the first set of electrical traces 206*a* and/or the second set of electrical traces 206*b* may include traces that electrically couple nonadjacent electrical components. For example, a subset of the first set of electrical traces 206*a* and a subset of the second set of electrical traces 206*b* may couple an electronic component in the first enclosure 204*a* to an electronic component in the third enclosure 204*c*. In some cases, these subsets of electrical traces may be routed through the second enclosure 204*b* but may not electrically couple to an electronic component in the second enclosure 204*b*.

In some cases, the electrical traces 206 can be configured bend, flex, stretch or otherwise deform with the band to conform to a user. In some cases, the electrical traces 206 can be routed in patterns that help reduce damage to the traces as the band is bent, flexed, stretched and so on. For example, the electrical traces 206 may be routed in a curved pattern. Additionally or alternatively, the band 202 may include one or more reinforcing layers that help prevent damage to the electrical traces 206, as described herein.

In some cases, the band 202 can include flexible cables/wires that connect the different enclosures 204 to each other. For example, a flexible cable may extend between two adjacent enclosures 204. The flexible cable may include electrical traces the electrically couple the electronic components in the different enclosures 204 and also mechanically couple the enclosures together. In some cases, the flexible cables may be have a cylindrical profile and one or more cables may extend between various enclosures 204.

Figure 2B:
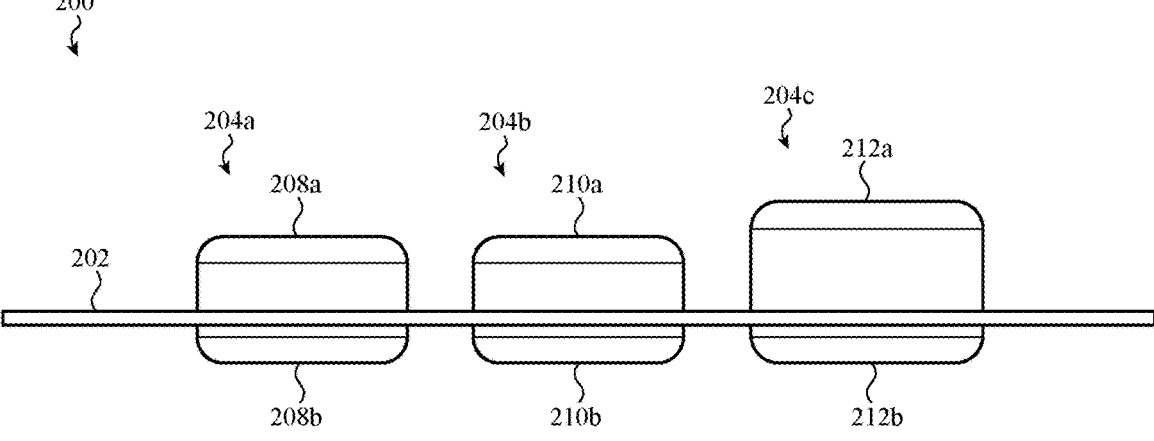
FIG. 2B shows a side view of an example wearable electronic device.

FIG. 2B shows a side view of the wearable electronic device 200. Each enclosure 204 can include multi-part housing the contains one or more electronic components. In some cases, the enclosures 204 may be a two-part housing that includes an upper enclosure segment positioned on a first side of the band 202 and a lower enclosure segment positioned on a second side of the band 202. For example, the first enclosure 204*a* can include an upper enclosure segment 208*a* positioned on a first side of the band 202 and a lower enclosure segment 208*b* positioned on a second side of the band 202. The upper and lower enclosure segments 208 can sandwich the band to form a sealed internal cavity, as described herein. The sealed internal cavity may protect an electronic component from water, dust, debris, and/or other environmental factors. The second enclosure 204*b* can include an upper enclosure segment 210*a* and a lower enclosure segment 210*b* that couple together around the band to form a sealed internal cavity. The third enclosure 204*c* can include an upper enclosure segment 212*a* and a lower enclosure segment 212*b* that coupled together around the band to form a sealed internal cavity.

As described herein, the profile (e.g., size and shape) of each enclosure 204 can be configured based on the electronic component contained within a respective enclosure. In some cases, the profile of each enclosure 204 may be minimized to contain the respective electronic component without having additional dead space. In other cases, each enclosure may be based on/selected from a defined set of standard profiles based on a closest fit to the underlying electronic component. In other cases, each enclosure may have the same profile, which may be based on the largest electronic component. The profiles of the different enclosures 204 can be configured in any suitable way.

Additionally or alternatively, the enclosures 204 can have aesthetic features that dictate an appearance and/or feel of the individual enclosures and/or the wearable electronic device 200. For example, the outer profile of an enclosure can be configured as different shapes such as a cylindrical outer profile, a spherical outer profile, or other suitable shape.

In some cases, the enclosures 204 can include materials that have specific properties such as a specific hardness/softness, specific and/or varying surface smoothness, surface features, have profiles based on a desired aesthetic quality, include different colors, reflectiveness, diffuseness and/or be configured to have other aesthetic properties. In some cases, the enclosures 204 can be over molded, be covered with fabric or textile, be covered with other materials such as polymers, ceramics, metals, wood materials, or other suitable materials, and/or combinations thereof.

Figure 3:
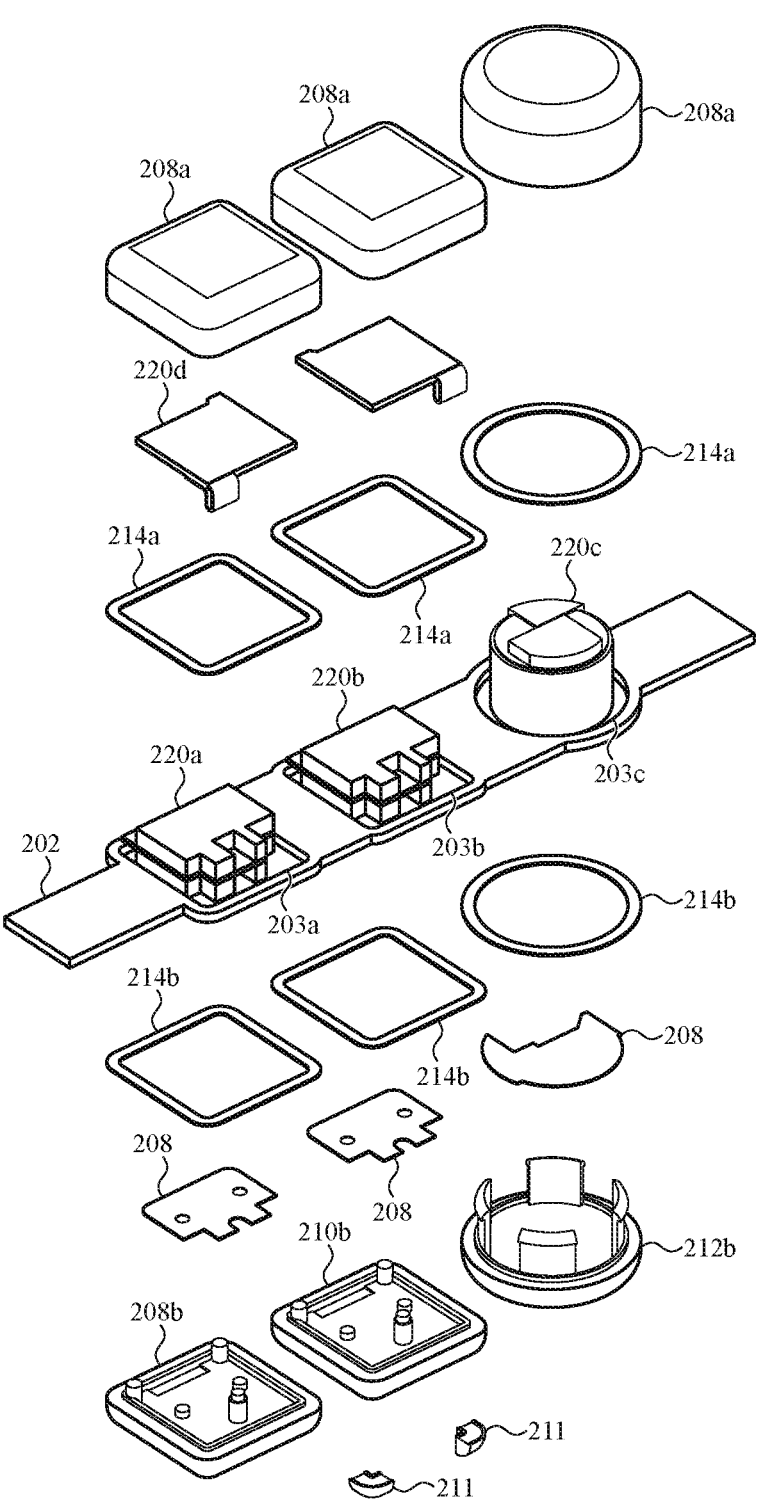
FIG. 3 shows an exploded view of an example wearable electronic device.

FIG. 3 shows an exploded view of the example wearable electronic device 200. The wearable electronic device 200 can include one or more electronic components 220 that are contained within each enclosure 204 (shown in FIG. 2). In some cases, the enclosures 204 and the band 202 can form sealed cavity that contains the one or more electronic components. The cavity can be sealed to protect the electronic components from water, air, debris, dust or other contaminants. In some cases, each cavity can be formed from an upper enclosure segment 208*a*, 210*a*, 212*a*, an upper seal 214*a* positioned between a respective upper enclosure segment 208*a*, 210*a*, 212*a* and the band 202; and a lower seal 214*b* positioned between a respective lower enclosure segment 208*b*, 210*b*, 212*b* and the band 202.

In some cases, the upper enclosure segments 208*a*, 210*a*, 212*a* and the lower enclosure segments 208*b*, 210*b*, 212*b* may include features that couple the upper and lower segments together. For example, a lower enclosure segment 212*b* may include fastening features (e.g., snap features) that engage with the upper enclosure segment 212*a* to couple the lower enclosure segment 212*b* to the upper enclosure segment 212*a*. In some cases, the coupling of an upper enclosure segment to a lower enclosure segment may cause the upper and lower segments to compress the band between a portion of the enclosure 204. Additionally or alternatively, the seals 214 may also be compressed between the enclosure 204 to seal the cavity. In some cases, the seals 714 can include an adhesive such as a pressure sensitive adhesive material that couples a respective enclosure 204 to the band. In other cases, the seals 714 can include compliant materials such as an O-ring, and or the like. In other cases, the seals 714 can include liquid adhesives and/or each enclosure 204 could be welded, molded or otherwise coupled to the band 202 to from a sealed cavity.

Each enclosure 204 can contain one or more electronic components. For example, a first enclosure 204a (shown in FIG. 2) can include a first electronic component 220a, a second enclosure 204b can include a second electronic component 220b and a third enclosure 204c can include a third electronic component 220c. In some cases, multiple electronic components may be contained within an enclosure. For example, the first enclosure 204a may also include a fourth electronic component 220d. The electronic components 220 can be coupled to the enclosures in a variety of ways including the use adhesives, using fastening features such as press fit, snap fit or other mechanical fastening techniques, and so on. In some cases, the enclosure segments 208, 210 and 212 can include features that secure and/or are used to mount the electronic components 220. The enclosure segments 208, 210, 212 may be formed from a variety of materials including polymers, rubbers, metals, ceramics, wood, other materials and/or combinations thereof.

The electronic components 220 can include any suitable electronic components, as described herein and include, processing units, power sources, memory, physiological sensors, movement sensors, communications modules, input/output devices, haptic devices, and so on. In some cases, one or more input/output and/or charging devices may be integrated into the enclosures 204. For example, the lower enclosure segment 210b may include charging contacts 211 that can form part of the lower enclosure segment 210b. The charging contacts 211 may include a conductive material that defines a portion of the outer surface of the shell and are electrically coupled to charging circuitry and/or a power source of the electronic device. In some cases, the charging contacts 211 can be located on the second enclosure 204b and the power source (e.g., battery) can be contained in a different enclosure, for example, the third enclosure 204c.

In some cases, the electronic components 220 may include components that enable a power source/battery to be inductively charged. Additionally or alternatively, the power source may be removable and/or replaceable.

In some cases, the electronic components 220 can be positioned in one or more openings 203 in the band 202. The band 202 can define openings 203, such as a first opening 203a, a second opening 203b and a third opening 203c that are positioned at each of the enclosures 204. The openings 203 can be positioned within an interior cavity of each enclosure 204 and provide space for a respective electronic component to extend through a respective opening 203. In some cases, fastening features on the enclosure segments 208, 210, 212 can extend through a respective opening 203. The upper and lower enclosure segments 208, 210 and 212 may at least partially overlap with/or contain an edge of a respective opening 203. That is, the band 202 may form a portion of the cavity of each enclosure, and/or be compressed between an upper and lower enclosure segment.

Additionally or alternatively, one or more of the enclosures may include input/output devices such as visual indicators (e.g., light based indicators), a display, a speaker(s), microphone, buttons, touch-sensitive surfaces, or other input/output devices that provide information to a user and/or allow user inputs to the wearable electronic device 200.

Figure 4:
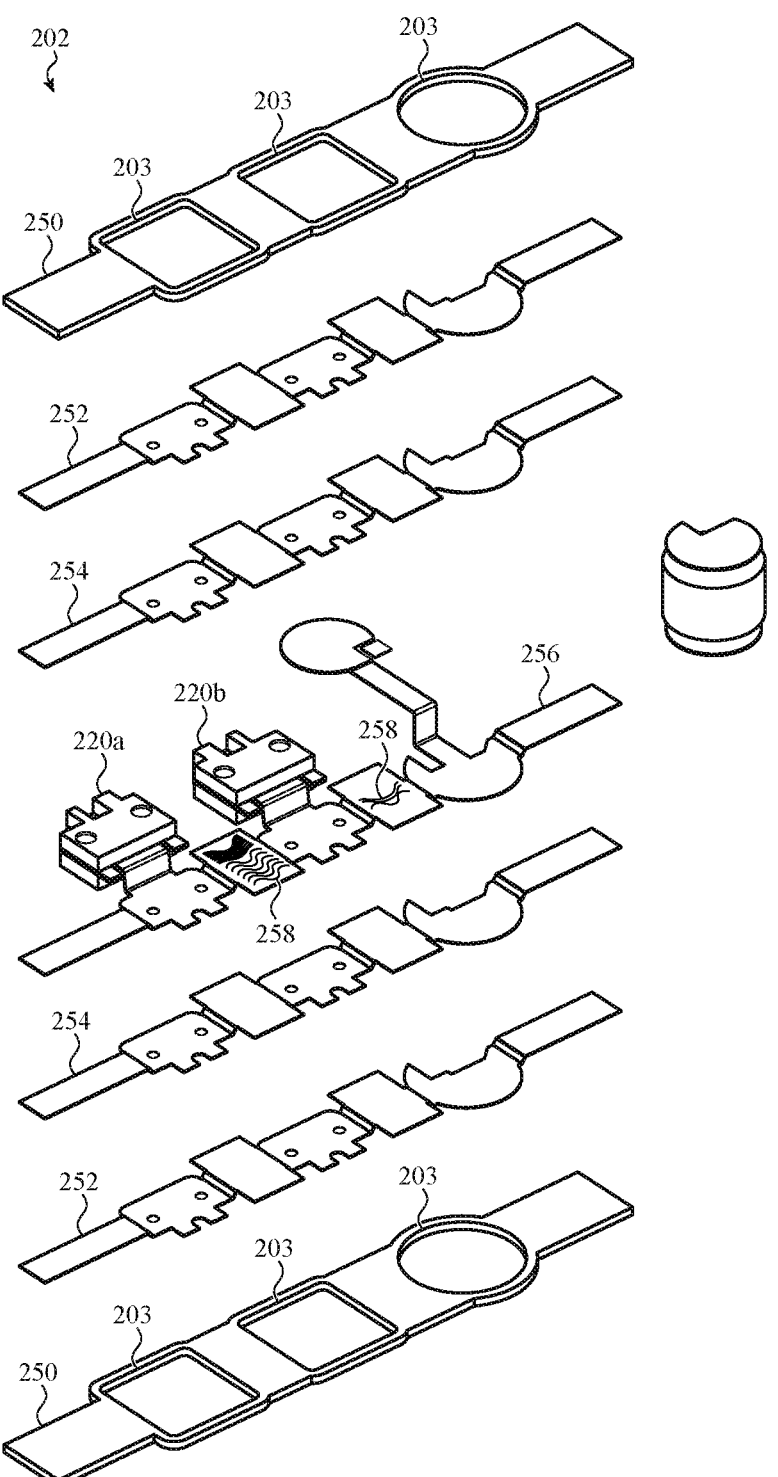
FIG. 4 shows an exploded view of a flexible band assembly of an example wearable electronic device.

FIG. 4 shows an exploded view of a flexible band 202 assembly of an example wearable electronic device 200. In some cases, the band 202 can include multiple layers. For example, the band may include one or more flexible layers 250, one or more reinforcing layers 252, one or more adhesive layers 254, and/or one or more electrical routing layers 256. Although multiple flexible layers 250, multiple reinforcing layers 252, and multiple adhesive layers 254 are shown, in some case, the wearable electronic device 200 may include a single one of each of these layer or additional ones of these layers.

The flexible layer(s) 250 can include materials that are configured to bend, stretch, or otherwise conform to a user when the device is being worn. The flexible layers 250 can define openings 203, as described herein. The flexible layer 250 can be formed from polymer and/or rubber materials including urethanes, silicones, and/or any other suitable materials. In some cases, the flexible layer 250 may be a composite material that includes flexible materials combined with more rigid materials. For example, the flexible layer 250 could include both silicone elastomers and metal, ceramic and/or other materials. The flexible layer 250 can be configured to deform elastically when worn by a user, such that the flexible layer 250 provides a compression force (or other force) that contracts the band around a portion of a user such as a user's writs. Accordingly, in some cases, the flexible layer 250 may help secure the wearable electronic device 200 to the user and prevent movement of the wearable device 200 with respect to the user.

The reinforcing layer(s) 252 may help prevent damage to electrical connections (e.g., electrical traces) on the routing layer 256. In some cases, the reinforcing layer(s) 252 can be formed from material(s) that can bend and/or conform to a user and have higher resistance to elongation. For example, the type of material(s) and thickness of the reinforcing layer 252 may be configured to limit extension of the band 202 within a defined amount to help reduce damage to electrical traces that would otherwise occur due to extension of the band 202. In some cases, the reinforcing layer can include fabrics such as Taffeta fabric, which can be flexible and resist elongation of the band 202.

The adhesive layer(s) 254 can include any suitable adhesives, such as adhesive films, pressure sensitive adhesives, liquid adhesives and so on. The adhesive layer(s) 254 can be used to join different layers of the stack up including the reinforcing layer 252 to the routing layer, the reinforcing layer to the flexible layer 250 and so on. In some cases, the adhesive layer 254 may be user to join a subset of layers and other attachment techniques can be used to join other layers. For example, one or more adhesive layers 254 can be used to join one or more reinforcing layers 252 to the routing layer 256 and the flexible layer may be attached by over molding, slot molding or other bonding techniques.

The routing layer 256 can include one or more electrical traces 258 that electrically couple different electronic components 220, as described herein. In some cases, the routing layer can include dedicated electrical traces 250 for each electronic component, which may allow individual electronic components to be independently powered on or off and/or otherwise controlled. For example, the first layer 256 may include a first set of dedicated electrical traces 258 between the processing unit 220b and the memory 220a and second set of dedicated electrical traces between the processing unit and a battery. If the wearable electronic device 200 includes additional electronic components, the routing layer 256 can include additional sets of dedicate electrical traces that go to each additional electronic component. For example, the routing layer 256 may include electrical traces between the processing unit and each additional electronic component. Accordingly, the processing unit may independently control operation of each different electrical component.

In some cases, the routing layer 256, may extend across/through the openings 203 and include areas for attaching each electronic component. In some cases, these areas may include electrical contacts that electrically couple to an electronic component. These portions of the routing layer may be located inside the cavity defined by a respective enclosure. Additionally or alternatively, the reinforcing layer(s) 252 and/or the adhesive layer(s) 254 may also extend across/through the cavity defined by a respective enclosure.

In some cases, functionality of one or more of the layers may be integrated. For example, to enable flexibility of the band 202 (e.g., between housing segments), electrical traces may be integrated into the flexible and/or reinforcing layer. For example, the band 202 can include a fabric materially having conductive fibers that form one or more traces. The fabric material having conductive fibers may allow the electrical traces to bend, elongate and/or otherwise flex to conform to the user while electrically coupling different electronic components 220 contained in different enclosures 204.

The band 202 and/or electronic components or portions of the electronic components (e.g., substrates and/or electrical connectors) may be formed using lithographic manufacturing techniques, additive manufacturing techniques and/or the like. For example, the band 202 and/or one or more substrates may be formed as an integrated structure. In these cases, the band 202 may include flexible segments extending between rigid substrates that are used to couple the electronic components to the band 202. These manufacturing techniques may be used to integrate electronic traces into the flexible segments and electrically couple the different electronic components that are coupled to each substrate. Accordingly, the band 202 may include rigid substrate sections that are separated by flexible band segments. In some cases the enclosures can be positioned at the substrate sections to enclose and/or seal the electronic components. The enclosures can include upper and lower enclosure segments as described herein. Additionally or alternatively, the electronic components may be over molded or otherwise encapsulated to seal the electronic components.

Figure 5A:
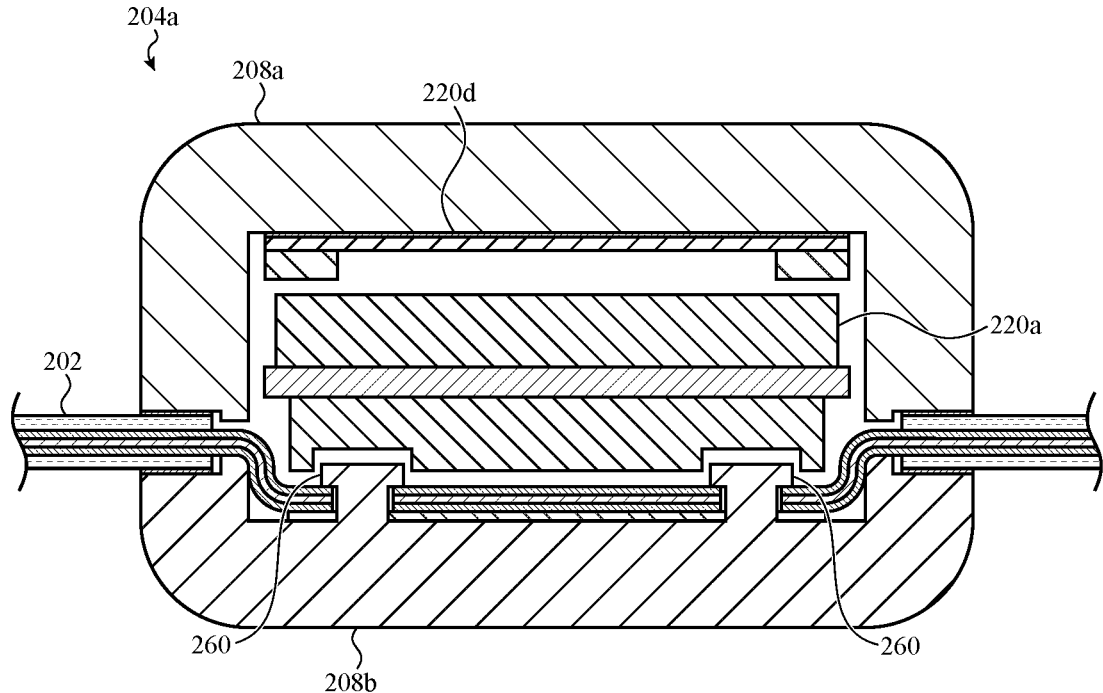
FIGS. 5A-5C show cross-sectional views of the wearable electronic device shown in FIG. 2A.
Figure 5B:
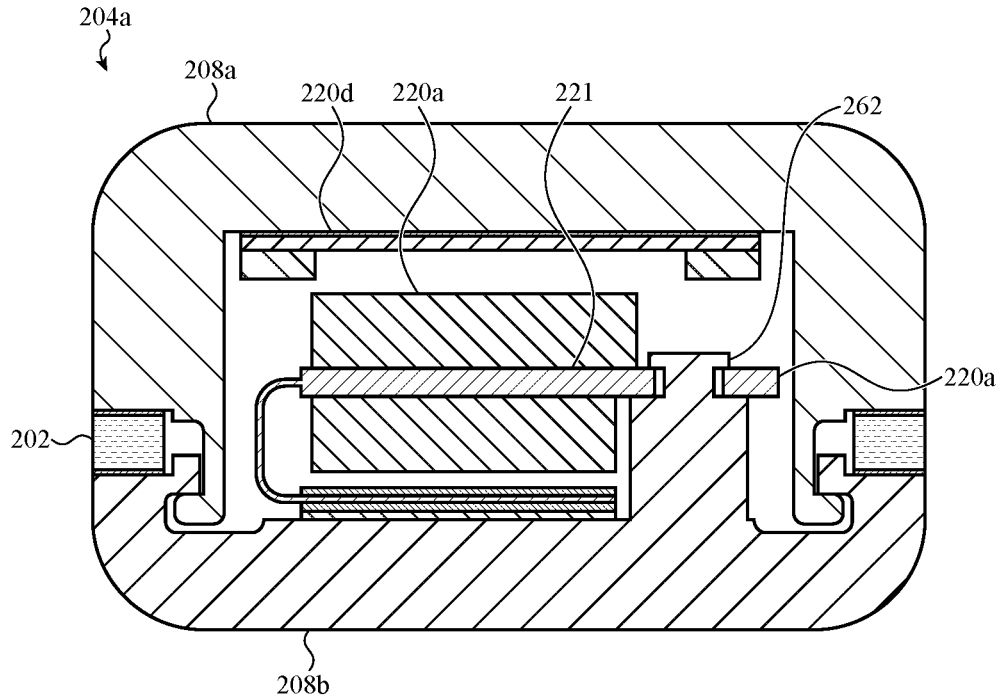
Figure 5C:
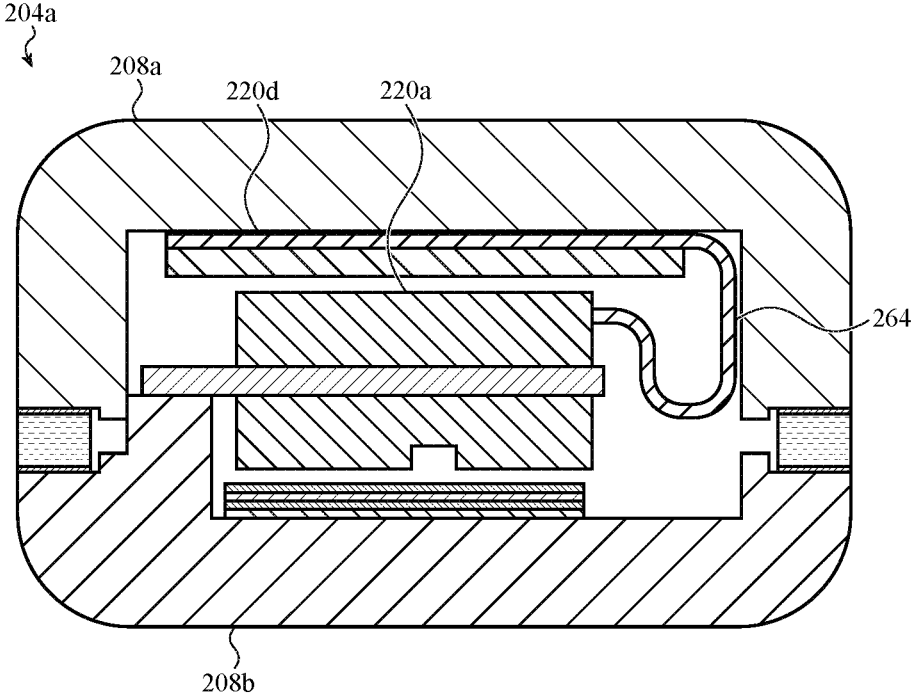

FIGS. 5A-5C show cross-sectional views of the example wearable electronic device 200 shown in FIG. 2A. The cross-sectional view shown in FIG. 5A is taken along line A-A, the cross section view shown in FIG. 5B is taken along line B-B and the cross-section view shown in FIG. 5C is taken along line C-C.

As shown in FIG. 5A, the first enclosure 204a can include one or more posts 260 that coupled to the band 202 (e.g., the reinforcing layer(s) and the routing layer). In some cases, specific layers of the band may be coupled to the one or more posts. For example, the reinforcing layer (e.g., reinforcing layer(s) 252 shown in FIG. 4) and/or the routing layer (e.g., routing layer 256 shown in FIG. 4), may couple to the post 260 and the flexible layer (e.g., flexible layer(s) 250) may not be coupled to the post 260. The posts 260 may provide additional support for coupling the band 202 to the first enclosure 204a, for example in additional to the adhesive layers as described herein. In some cases, an electronic component (e.g., the first electronic component 220a) can couple to the posts 260 to secure the electronic component within the first enclosure 204a.

The first enclosure may include multiple electronic components 220. For example, the first electronic component 220a may include a processing unit and the second electronic component 220d may include a communication module such as an NFC or Bluetooth antenna. The second electronic component 220d can be coupled to a different portion of the enclosure, such as an interior portion of the upper enclosure segment. In some cases, the first electronic component 220a may include a substrate layer 221 that couples to a mount 262 that is part of the first enclosure 204a, as shown in FIG. 5B. As shown in FIG. 5C, the first electronic component 220a can be coupled to the second electronic component using one or more electrical connectors 264.

Figure 6A:
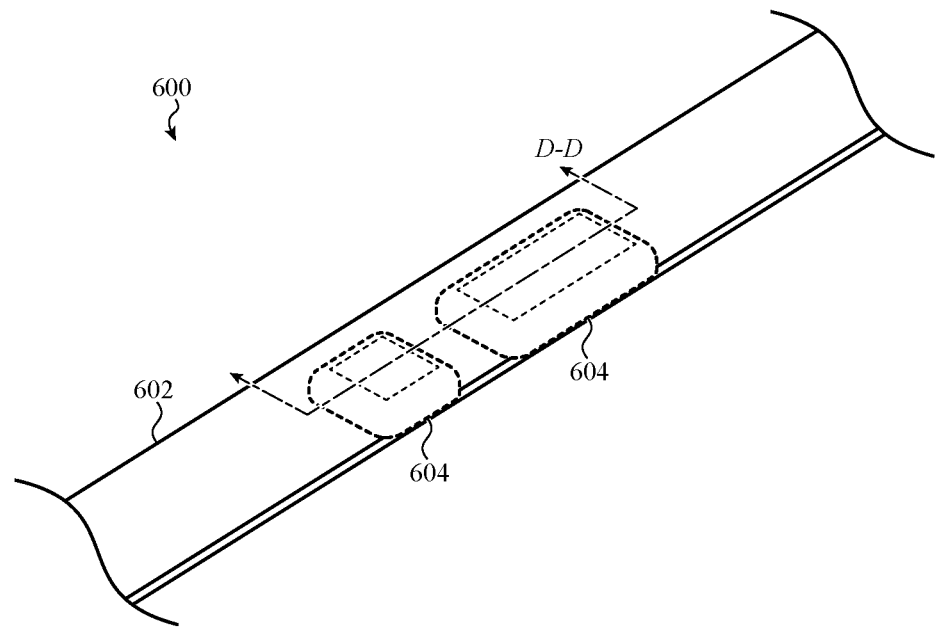
FIG. 6A shows a perspective view of an example wearable electronic device.

FIG. 6A shows a perspective view of an example wearable electronic device 600. The wearable electronic device 600 can be an example of the wearable electronic devices described herein and includes a band 602 and multiple enclosures 604 that each contain one or more electronic components. The band 602 can be configured to wrap around a limb of a user to secure the wearable electronic device 600 to the user. The band 602 can be flexible and include electrical traces that electrically couple different electronic components, as described herein.

Figure 6B:
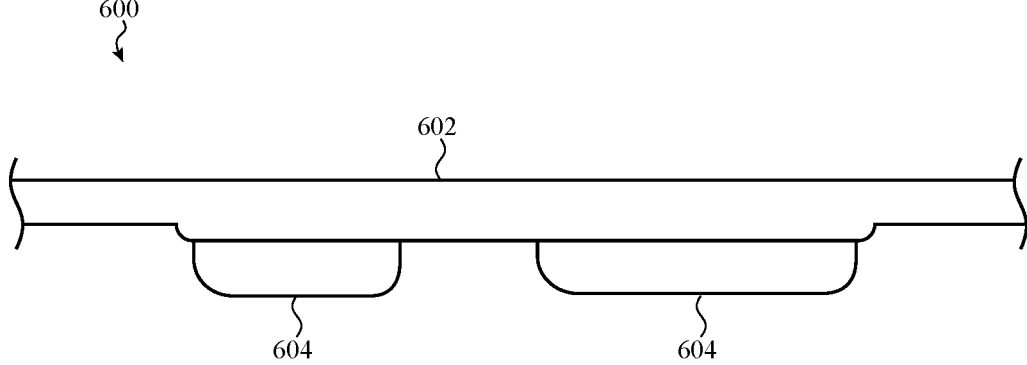
FIG. 6B shows a side view of the example wearable electronic device shown in FIG. 6A.

FIG. 6B shows a side view of the example wearable electronic device 600 shown in FIG. 6A. In some cases, the wearable electronic device 600 can include enclosures 604 that are partially or fully covered by the band 602. For example, the band 602 can partially or fully surround one or more of the enclosures 604. In some cases, as shown in FIG. 6B, a first portion of each enclosure 604 may be covered/encapsulated by the band 602 and a second portion of each enclosure may be exposed to the external environment.

The band 602 can be configured to protect the enclosures 604 from environmental conditions such as water ingress, dust, dirt or other debris. The band 602 may be flexible and allow different enclosures 604 to move independently of each other.

Figure 7:
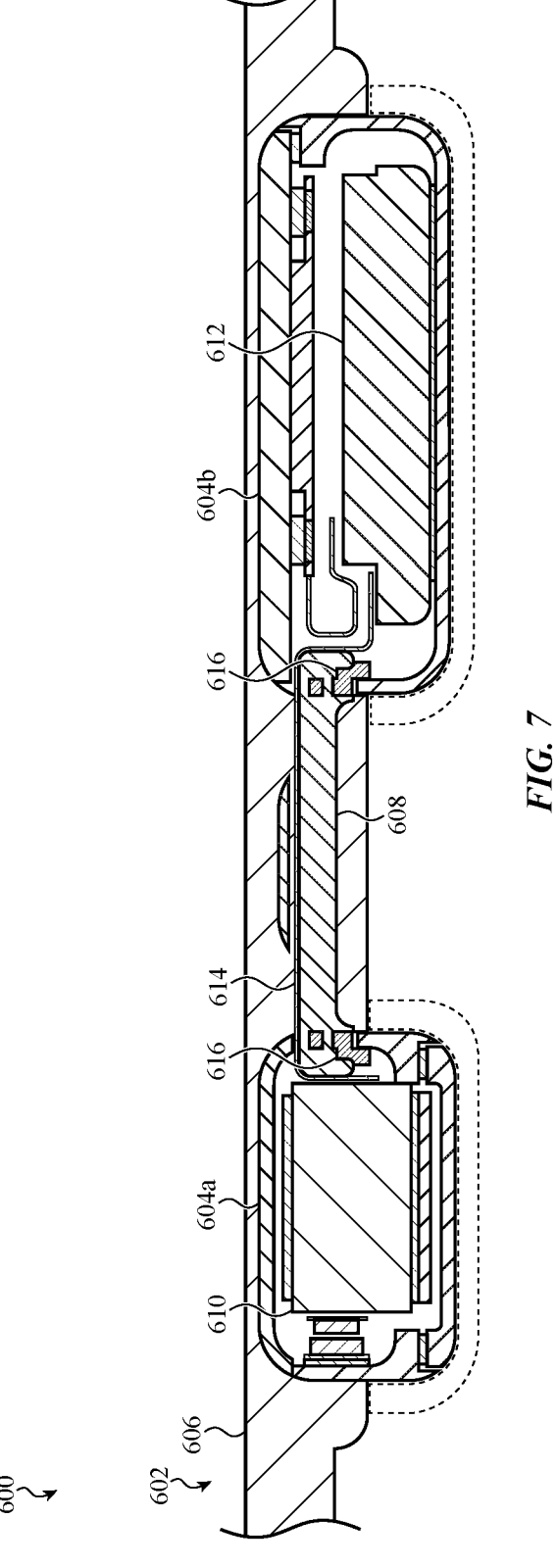
FIG. 7 shows a cross-sectional view of the wearable electronic device shown in FIG. 6A

FIG. 7 shows a cross-sectional view of the wearable electronic device 600 taken along line D-D shown in FIG. 6A. The band 602 can include a flexible outer component 606 and a support 608 that is coupled to adjacent enclosures 604. The support 608 can have a first end coupled to a first enclosure 604a and a second end coupled to a second enclosure 604b. In some cases, the support 608 is flexible and can flex/elastically deform to allow movement between the first enclosure 604a and the second enclosure 604b. In other cases, the support 608 may be rigid and have minimal or no flex under typical use conditions.

In some cases, the support 608 can be coupled to each enclosure 604 using seals 616. The seals 616, can be configured to flex, which can allow the support 608 to move with respect to each of the enclosures 604. The seals 616 can be configured to prevent water, dust, debris and/or other contaminants from entering a respective enclosure 604. For example, the seals 616 can be a polymer or other suitable material. In some cases, the support 608 may be positioned within an enclosure 604 and the seal is formed around the support 608 (e.g., via molding or other suitable manufacturing process).

The flexible outer component 606 can be formed around the support 608 and the enclosures 604. In some cases, the flexible outer component 606 can be molded or otherwise applied over the support 608, the enclosures 604 and/or other components and fully or partially surround one or more of these components. The flexible outer component 606 may include polymer, ceramic, metal, and/or other suitable materials. The flexible outer component 606 may be bonded or otherwise coupled to the enclosures 604 and/or the support 608 and configured to prevent ingress of water, dust, debris and/or other contaminates to the enclosures 604 and/or the support 608.

In the example, shown in FIG. 7, the wearable electronic device 600 include a first enclosure 604a that contains a battery 610 (and supporting hardware) and a second enclosure 604b that contains a processor 612 (and supporting hardware). The wearable electronic device 600 includes a routing layer 614 which has electrical traces that electrically couple the battery 610 and the processor 612. The routing layer 614 may be coupled to the support 608 and extend across or otherwise be routed between the enclosures 604 and electrically coupled to a respective electronic component contained within each different enclosure.

Figure 8:
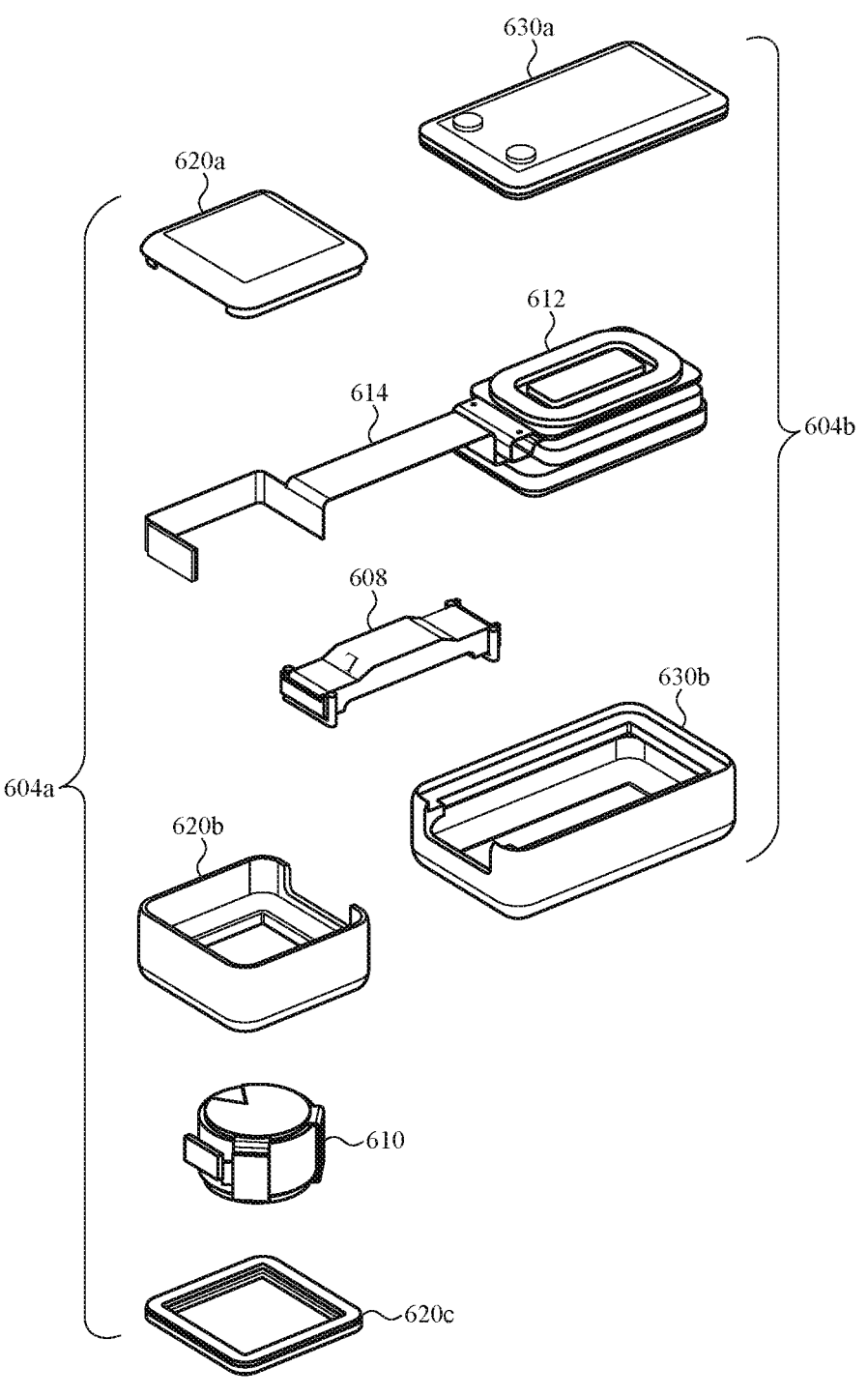
FIG. 8 shows an exploded view of components of the wearable electronic device shown in FIG. 6A.

FIG. 8 shows an exploded view of select components of the wearable electronic device 600. In some cases, one or more of the enclosures 604 can be formed from multiple joined components. For example, the first enclosure 604a can include a first housing component 620a, a second housing component 620b and a third housing component 620c. The housing components 620 may be joined using any suitable processes including adhesive fastening, welding processes, mechanical joining, and so on. The housing components 620 may be joined to form a sealed volume around the battery 610. In some cases, one or more of the housing components 620 may be removable, which may allow the battery 610 or other electrical components to be accessed and/or replaced. For example the third housing component 620c, which may not be covered by the flexible outer component 606, can be separated from the second housing component 620b and reattached to the second housing component 620b.

The second enclosure 604b can include two housing components, including an upper housing component 630a and a lower housing component 630b. In other cases, the enclosures 604 can include a single housing component (e.g., molded or formed around an electronic component) and/or other numbers of housing components (e.g., four or more housing components that join together to form an enclosure 604).

The support 608 can include features that couple to or otherwise interface with the routing layer 614 to reinforce or otherwise protect the routing layer 614. For example, an upper portion of the support 608 may define a channel and the routing layer 614 can be positioned at least partially within the channel. Additionally or alternatively, the support 608 can include other features such as an upper portion that covers at least a portion of the upper surface of the routing layer 614. In the example shown in FIG. 8, the routing layer 614 extends between two enclosures 604 and electrically couples the electronic components contained within each enclosure. In cases where there are additional enclosures, the routing layer 614 may extend to the other enclosures and/or the wearable electronic device 600 can include multiple routing layers that electrically couple different electronic components contained within separate enclosures.

Figure 9A:
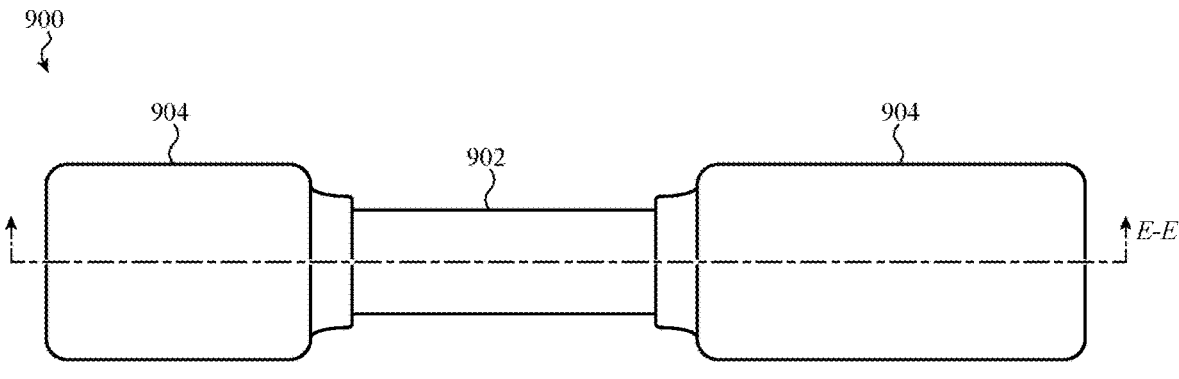
FIG. 9A shows a top view of an example wearable electronic device.

FIG. 9A shows a top view of an example wearable electronic device 900. The wearable electronic device 900 can be an example of the wearable electronic devices described herein and include a band 902 and multiple enclosures 904 that each contain one or more electronic components. The band 902 can be configured to wrap around a limb of a user to secure the wearable electronic device 900 to the user, as described herein. The band 902 can be flexible and include electrical traces that electrically couple different electronic components, as described herein.

Figure 9B:
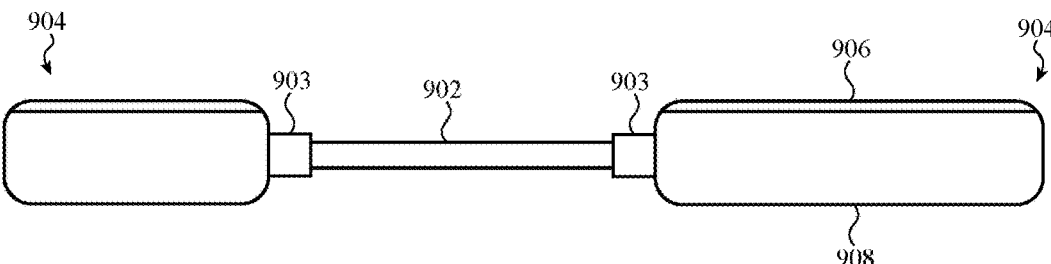
FIG. 9B shows a side view of the example wearable electronic device shown in FIG. 9A.
Figure 10:
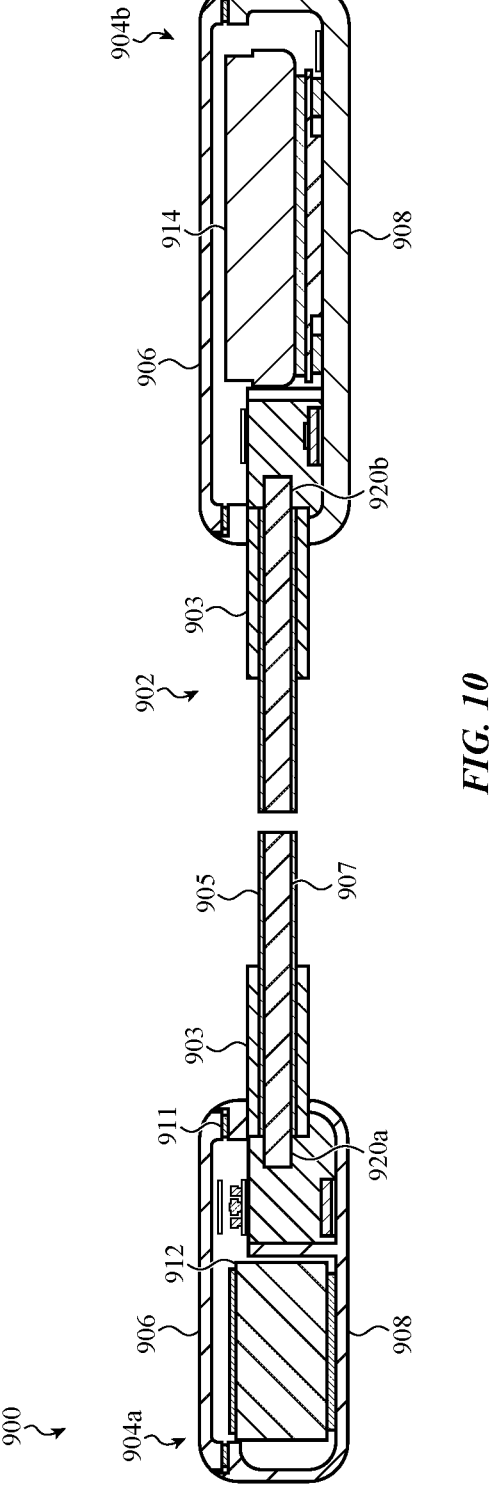
FIG. 10 shows a cross-sectional view of the wearable electronic device shown in FIG. 9A.

The example wearable electronic device 900 shown in FIGS. 9A, 9B and 10 includes a band 902 that is formed from cable or ribbon-style electrical connectors that electrically and mechanically couple the different enclosures 904. In some cases, the band 902 can include one or more cylindrical electrical connectors that couple adjacent enclosures 904. In these cases, each cylindrical electrical connector can include one or more conductors that are contained within an outer enclosure, which protects the conductors. Each cylindrical connector can include a single conductive component or multiple electrically isolated conductive components that are each configured to independently transmit electrical signals. In other cases, the band 902 can be a ribbon-style connector that includes one or more internal conductive components that transmit electrical signals. The ribbon-style connector may have a flat shape with the multiple conductive components arranged side-by-side and/or stacked.

FIG. 9B shows a side view of the example wearable electronic device 900. The band 902 can include flexible reinforcements 903 that are joined to each enclosure 904. The flexible reinforcements 903 can be configured to help seal the electrical connector to the enclosures 904. Each enclosure 904 can be formed from multiple housing components, as described herein. For example the enclosures 904 can include a first housing component 906 that is coupled to a second housing component 908. The first housing component 906 can be sealed to the second housing component 908 to prevent the ingress of water, dust, debris or other contaminates.

FIG. 10 shows a cross-sectional view of the wearable electronic device 900 taken along line E-E shown in FIG. 9A. In the example shown in FIG. 10, the electronic device 900 include a first enclosure 904a that contains a battery 910 and a second enclosure 904b that contains a processor 914. Each enclosure 904 includes a seal 911, which couples the first housing component 906 to the second housing component 908 for each respective enclosure 904. The seal 911 can include adhesive materials that secure the housing components.

The band 902 can include one or more conductive components 907, which may be conductive wire(s) that electrically couple to electronic components contained within adjacent enclosures. For example, the conductive components 907 conductively couple the battery to the processor and is configured to transmit electrical signals between these components. The conductive components 907 are contained within a sealed cable 905, which insulates the conductive components 907 from the external environment and separates various conductive components 907, which can carry different electrical signals. The conductive components 907 and the sealed cable can be flexible and allow the enclosures to move with respect to each other.

The band 902 includes a first end 920a, which is coupled to the first enclosure 904a and a second end 920b, which is coupled to the second enclosure 904b. The ends 920 may be coupled to their respective enclosures using any suitable processes including potting and adhesive materials, which may both seal an end 920 of the cable to a respective enclosure 904 and provide mechanical retention of the end 920 of the cable within the respective enclosure 904.

FIG. 11A-11D show example wearable electronic devices having different configurations. The electronic components (and enclosures) can be arranged in a variety of different configurations on one or more bands. In some cases, the electronic components may be arranged based on a function of each component and/or based on what other components a particular electronic components are electrically coupled to. For example, a processing unit may be electrically coupled to each other electronic component, and therefore be more centrally located within the device, which may help reduce the amount of electrical traces and/or simplify routing of the electrical traces.

Additionally or alternatively, the positioning of electronic components that include one or more sensors may be based on the type of sensing performed by the electronic component. For example, a particular electronic component may include sensors that are configured to measure a user's heart rate. For example, the electronic component may include a vibration sensor (e.g., microphone) that measures blood flow through a user's blood vessels, a PPG sensor, an accelerometer that can detect heart rate pulses, and so on. In some cases, one or more of these electronic components (and their respective housing) may be positioned over a major blood vessel when the wearable electronic device is worn by a user. For example, if the wearable electronic device is worn around a wrist of the user. One or more electronic components may be positioned on the wearable electronic device so that they are positioned close to the ulnar or radial arteries and/or other blood vessels.

Figure 11A:
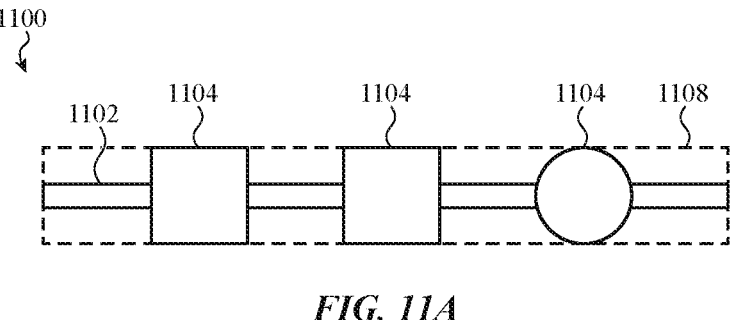
FIGS. 11A-11D show example band and enclosure configurations for a wearable electronic device.

FIG. 11A shows an example wearable electronic device 1100 that has a single band 1102 having a linear arrangement of the electronic components and corresponding enclosures 1104, which may be an example of the wearable electronic devices described herein. In some cases, the wearable electronic device 1100 or individual enclosure 1104 may include or be covered with materials that provide a desired look or feel from the device. For example, the wearable electronic device 1100 may include a cover 1108 that is placed over a portion of the band 1102 and the enclosures 1104 or over the entire wearable electronic device 1100. The cover 1108 can be a conformal cover that conforms that the shape of the underlying band 1102 and/or enclosures. The cover 1108 can be a conformal fabric, a shrinkable material (e.g., heat shrink material), an over molded material, or any other suitable conformal material. In some cases, different portions of the wearable electronic device 1100 can be covered with different materials. For example, each enclosure may be covered with a first conformal material (e.g., a conformal textile) and the band 1102 may be covered with a second, different material (e.g., a silicone rubber).

In some cases, the cover 1108 may change an appearance, shape and/or feel of the band 1102 and/or enclosures. For example, the cover could include a tube (or other shape) that has a uniform outer profile. The band 1102 and enclosures may be positioned in the tube, which may make the wearable electronic device have a tube shaped outer profile. In some cases, the tube shaped cover 1108 may include a filler material that fills areas between the enclosures to give the wearable electronic device a uniform thickness. In these examples, the cover may include one or more textile materials, polymer materials, metals, ceramic materials, wood and so on, and/or a combination of any of these materials.

Figure 11B:
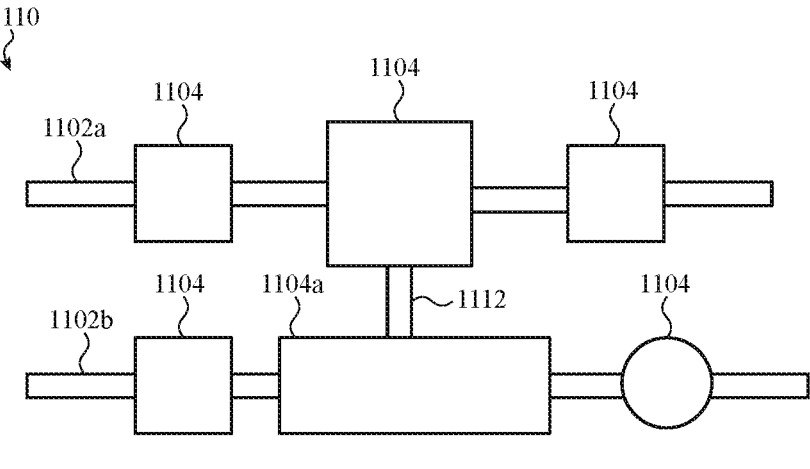

FIG. 11B shows an example of a wearable electronic device 1110 that has two bands 1102 that each include electronic components that are each contained within enclosures 1104. The wearable electronic device 1110 may include a first band 1102a that has first enclosures 1104a and a second band 1102b that has second enclosures 1104b. In some cases, a connector 1112 may couple the first band 1102a to the second band 1102b. The connector 1112 can include electrical traces that electrically couple electronic components on the first band 1102a to electronic components on the second band 1102b, as described herein. In some cases, the connector 1112 may extend from one of the first enclosures 1104a to one of the second enclosures 1104b, and the electrical traces to other electronic components may be routed through these enclosures. In other cases, the connector 1112 may directly couple the first band 1102a to the second band 1102b. In other cases, the connector 1112 may couple one or more enclosures on one of the bands (e.g., the first band 1102a) directly to the other band (e.g., the second band 1102b).

Figures 11C, 11D:
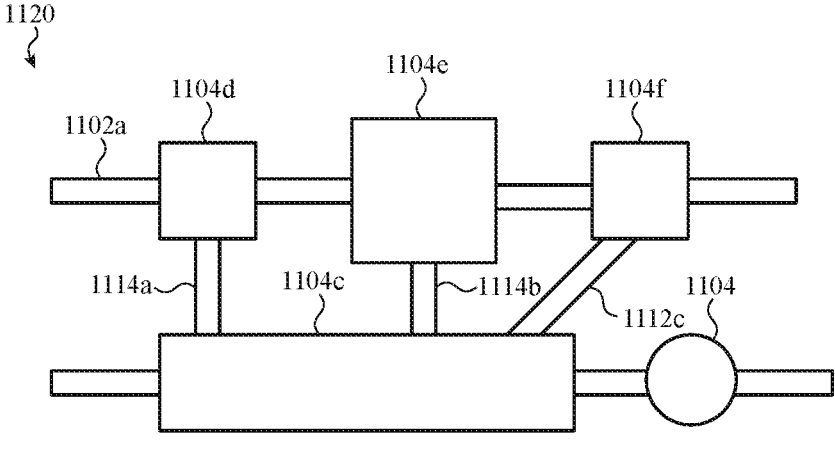

FIG. 11C shows an example of a wearable electronic device 1120 that includes multiple connectors 1112 that couple electronic components on one band 1102 to electronic components on the other band 1102. For example, a first electronic component may be contained within a first enclosure 1104c. The wearable electronic device 1120 may include a first connector 1114a that couples an electronic component(s) in the first enclosure 1104c to an electronic component in a second enclosure 1104d, a second connector 1114b that coupled the electronic component(s) in the first enclosure 1104c to a third electronic component in a third enclosure 1104c, and a third connector 1112c that couples an electronic component(s) in the first enclosure 1104c to an electronic component in a fourth enclosure 1104f. The electronic component(s) in the first enclosure 1104c may include a processing unit(s) that control operation of the wearable electronic device, which can be individually electrically coupled to different other electronic components to independently control operation of each of the different electronic components.

FIG. 11D shows an example of a wearable electronic device 1130 that includes multiple enclosures 1104 (one of which is labeled for clarity) that are interlinked with connectors 1116 (one of which is labeled for clarity). In some cases, the enclosures 1104 can be arranged in a pattern that resembles a link-type watch band. Enclosure 1104 may be coupled to one or more adjacent enclosures using electrical connectors 1116 that include electrical traces or other electrical connectors that electrically couple electronic components in adjacent enclosures 1104. The connectors 1116 may be rigid or flexible and allow movement of adjacent enclosures with respect to each other. For example, the connectors 1116 may define specific movement profiles, such as allowing adjacent enclosures to pivot/rotate about a connector 1116 (and an adjacent enclosure 1104). In some cases, connectors 1116 may statically couple an enclosure to an adjacent enclosure and prevent relative movement between the enclosures. In some cases, some enclosures may not contain electronic components.

A combination of different connectors 1116 may be used in the wearable electronic device 1130. For example, each row may include a first connector 1116a that allows enclosures within a particular row to pivot with respect to adjacent enclosures 1104 in the same row. The wearable electronic device may include a second connector 1116b that couples adjacent rows to each other and the second connector 1116b may allow an enclosure 1104 in a first row to rotate with respect to an enclosure 1104 in a second row, for example, similar to link-based watch band. In other embodiments, the enclosures 1104 may be staggered, overlapped or arranged in any suitable manner.

Figure 12:
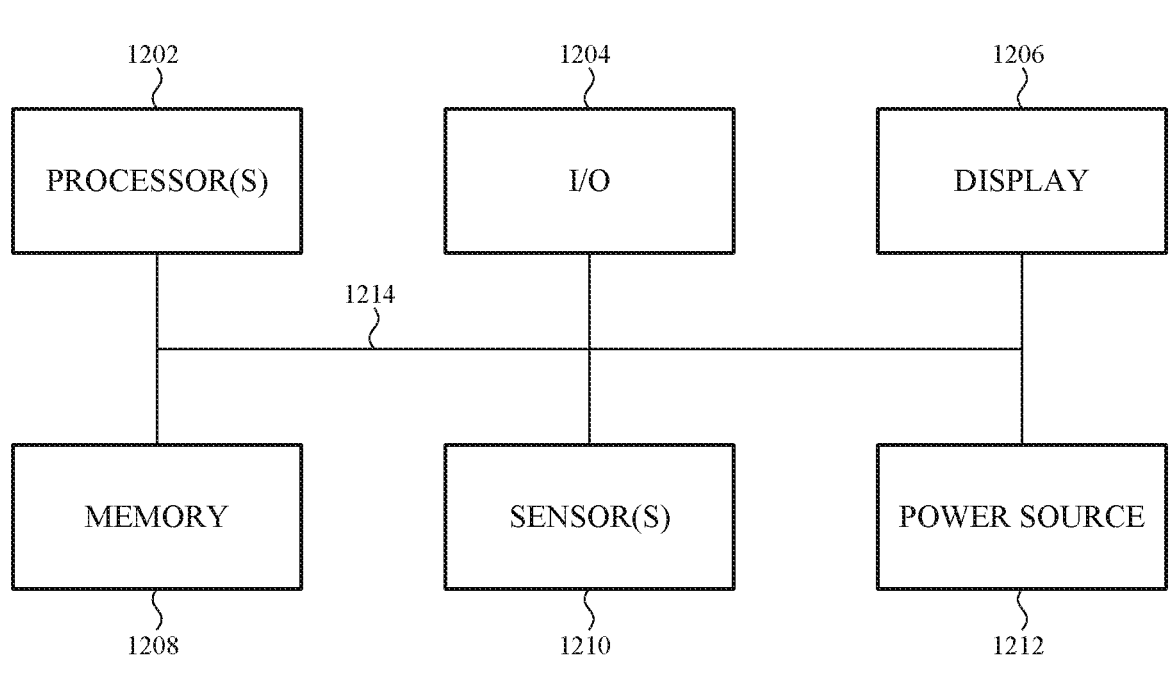
FIG. 12 is an example block diagram for wearable electronic devices described herein.

FIG. 12 is an example block diagram of a wearable electronic device 1200, which can take the form of any of the devices as described with reference to FIGS. 1-11. The wearable electronic device 1200 can include electronic components such as a processor 1202, an input/output (I/O) mechanism 1204 (e.g., wired or wireless communications interfaces), a display 1206, memory 1208, sensors 1210 (e.g., touch and/or force sensors), and a power source 1212 (e.g., a rechargeable battery). As described herein different electronic components may each be contained within a different enclosure on the wearable electronic device and electrically coupled to each other via a band.

The processor 1202 can control some or all of the operations of the wearable electronic device 1200. The processor 1202 can communicate, either directly or indirectly, with some or all of the electronic components of the wearable electronic device 1200. For example, a system bus or other communication mechanism 1214 can provide communication between the processor 1202, the I/O mechanism 1204, the memory 1208, the sensors 1210, and the power source 1212. The system bus and/or electrical traces may be part of the band and carry electrical signals (e.g., power, control signals, measured data, and so on) between various electronic components.

The processor 1202 can be implemented as any electronic device capable of processing, receiving, or transmitting data or instructions. For example, the processor 1202 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitable computing element or elements. In some cases, one or more processors may be located in a single enclosure. Additionally or alternatively, multiple processors can be located in different enclosures.

It should be noted that the components of the electronic device 1200 can be controlled by multiple processors. For example, select components of the wearable electronic device 1200 (e.g., a sensor 1210) may be controlled by a first processor and other components of the electronic device 1200 and other component of the electronic device 1200 (e.g., the I/O 1204) may be controlled by a second processor, where the first and second processors may or may not be in communication with each other and in the same or different enclosures.

The I/O device 1204 can transmit and/or receive data from a user or another electronic device. An I/O device can transmit electronic signals via a communications network, such as a wireless and/or wired network connection. Examples of wireless and wired network connections include, but are not limited to, NFC, cellular, Wi-Fi, Bluetooth, IR, and Ethernet connections. In some cases, the I/O device 1204 can communicate with an external electronic device, such as a smartphone, smartwatch, or other portable electronic device, as described here.

The electronic device may optionally include a display 1206 such as a liquid-crystal display (LCD), an organic light emitting diode (OLED) display, a light emitting diode (LED) display, or the like. If the display 1206 is an LCD, the display 1206 may also include a backlight component that can be controlled to provide variable levels of display brightness. If the display 1206 is an OLED or LED type display, the brightness of the display 1206 may be controlled by modifying the electrical signals that are provided to display elements. The display 1206 may correspond to any of the displays shown or described herein.

The memory 1208 can store electronic data that can be used by the electronic device 1200. For example, the memory 1208 can store electrical data or content such as, for example, audio and video files, documents and applications, device settings and user preferences, timing signals, control signals, and data structures or databases. The memory 1208 can be configured as any type of memory. By way of example only, the memory 1208 can be implemented as random access memory, read-only memory, Flash memory, removable memory, other types of storage elements, or combinations of such devices.

The electronic device 1200 may also include one or more sensors 1210 positioned almost anywhere on the electronic device 1200 and contained within one or more enclosures. The sensor(s) 1210 can be configured to sense one or more types of parameters, such as but not limited to, pressure, light, touch, heat, movement, relative motion, biometric data (e.g., biological parameters), and so on. For example, the sensor(s) 1210 may include a heat sensor, a position sensor, a light or optical sensor, an IMU, an accelerometer, a pressure transducer, a gyroscope, a magnetometer, a health monitoring sensor, and so on. The sensor(s) 1210 may include optical sensors such as PPG sensors and/or ECG sensors. Additionally, the one or more sensors 1210 can utilize any suitable sensing technology, including, but not limited to, capacitive, ultrasonic, resistive, optical, ultrasound, piezoelectric, and thermal sensing technology.

The power source 1212 can be implemented with any device capable of providing energy to the electronic device 1200. For example, the power source 1212 may be one or more batteries or rechargeable batteries. Additionally or alternatively, the power source 1212 can be a power connector or power cord that connects the electronic device 1200 to another power source, such as a wall outlet.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable electronic device comprising:
a multilayered band comprising:
a flexible layer defining multiple openings; and
a routing layer coupled to the flexible layer and extending across each of the multiple openings, the routing layer comprising a set of electrical traces;
a first assembly coupled to the multilayered band at a first opening of the multiple openings, the first assembly, comprising:
a first upper enclosure segment positioned at a first side of the multilayered band; and
a first lower enclosure segment positioned at a second side of the multilayered band; and
a processing unit at least partially enclosed by the first upper enclosure segment and the first lower enclosure segment, positioned at least partially within the first opening and electrically coupled to the routing layer;

a second assembly coupled to the multilayered band at a second opening of the multiple openings, the second assembly comprising:

a second upper enclosure segment positioned at the first side of the multilayered band; and a second lower enclosure segment positioned at the second side of the multilayered band; and a battery at least partially enclosed by the second upper enclosure segment and the second lower enclosure segment, positioned at least partially within the second opening and electrically coupled to the processing unit via the routing layer.

2. The wearable electronic device of claim 1, wherein:

at least one of the first upper enclosure segment or the first lower enclosure segment comprises a first fastening feature extending through the flexible layer; and at least one of the second upper enclosure segment or the second lower enclosure segment comprises a second fastening feature extending through the flexible layer.

3. The wearable electronic device of claim 1, further comprising:

a third enclosure coupled to the multilayered band;

a memory unit enclosed within the third enclosure and electrically coupled to the processing unit via the routing layer;

a fourth enclosure coupled to the multilayered band; and a physiological sensor enclosed within the fourth enclosure and electrically coupled to the processing unit via the routing layer.

4. The wearable electronic device of claim 3, wherein the processing unit is configured to control operation of the battery, the memory unit and the physiological sensor.

5. The wearable electronic device of claim 4, wherein:

each of the first enclosure, the second enclosure, the third enclosure and the fourth enclosure are separated by a band segment; and each respective band segment defines a flexible region extending between adjacent enclosure segments.

6. The wearable electronic device of claim 1, wherein the multilayered band further comprises a reinforcing layer coupled to the flexible layer and the routing layer.

7. The wearable electronic device of claim 1, wherein:

the second enclosure comprises charging contacts positioned on an exterior portion of the second enclosure; and the charging contacts are electrically coupled to the battery.

8. The wearable electronic device of claim 1, wherein:

the first enclosure defines a first outer profile; and the second enclosure defines a second outer profile, different from the first outer profile.

9. A wearable electronic device comprising:

a flexible band comprising:

a flexible layer;

a first substrate coupled to a first portion of the flexible layer, the first substrate defining a first rigid segment along the flexible band;

a second substrate coupled to a second portion of the flexible layer, the second substrate defining a second rigid segment along the flexible band;

a third substrate coupled to a third portion of the flexible layer, the third substrate defining a third rigid segment along the flexible band; and electrical traces coupled to the flexible layer and extending between the first, second and third substrates;

a processing unit coupled to the first substrate;

a battery coupled to the second substrate;

a sensor coupled to the third substrate; and multiple enclosures each comprising an upper enclosure segment positioned at a first side of the flexible band and a lower enclosure segment positioned at a second side of the flexible band, the multiple enclosures each comprising:

a first enclosure containing the processing unit;

a second enclosure containing the battery; and a third enclosure containing the sensor.

10. The wearable electronic device of claim 9, further comprising one or more seals, wherein:

the flexible band comprises a routing layer comprising the electrical traces;

the flexible layer is coupled to the routing layer;

the first enclosure comprises:

a first upper enclosure segment coupled to a first side of the flexible band; and a first lower enclosure segment coupled to a second side of the flexible band;

a first seal of the one or more seals is positioned between the first upper enclosure segment and the flexible band; and a second seal of the one or more seals is positioned between the first lower enclosure segment and the flexible band.

11. The wearable electronic device of claim 10, wherein:

the one or more seals comprise adhesive material that couples the first enclosure to the flexible band and seals the first enclosure from an external environment; and at least one of the first upper enclosure segment or the first lower enclosure segment comprises a fastening feature that extends through the flexible layer.

12. The wearable electronic device of claim 9, wherein the first enclosure, the second enclosure and the third enclosure are arranged in a single row along the flexible band.

13. The wearable electronic device of claim 9, wherein each of the first enclosure, the second enclosure, and the third enclosure comprise a different outer profile from each other enclosure of the multiple enclosures.

14. The wearable electronic device of claim 9, wherein the sensor comprises one of a movement sensor, a physiological sensor or a combination thereof.

15. The wearable electronic device of claim 9, wherein:

at least one of the first enclosure, the second enclosure or the third enclosure comprises an output device that is configured to provide outputs to a user; and the output device comprises at least one of a display, a speaker, a haptic device or a combination thereof.

16. A wearable electronic device comprising:

a first flexible band comprising a first set of electrical traces, the first flexible band configured to encircle at least a portion of a user's wrist;

a second flexible band comprising a second set of electrical traces, the second flexible band configured to encircle at least the portion of the user's wrist and offset from the first flexible band;

a first set of enclosures coupled to the first flexible band, the first set of enclosures comprising:

a first enclosure containing a first electronic component coupled to the first set of electrical traces; and a second enclosure containing a second electronic component coupled to the first set of electrical traces;

a second set of enclosures coupled to the second flexible band, the second set of enclosures comprising:

a third enclosure containing a third electronic component coupled to the second set of electrical traces; and a fourth enclosure containing a fourth electronic component coupled to the second set of electrical traces; and a connector electrically coupling the first set of electrical traces to the second set of electrical traces, wherein one of the first, second, third or fourth electronic components comprises a processing unit that is configured to control operation of the other electronic components.

17. The wearable electronic device of claim 16, wherein the connector extends between an enclosure containing the processing unit and at least one of the other enclosures.

18. The wearable electronic device of claim 16, wherein the connector extends between the first flexible band and the second flexible band.

19. The wearable electronic device of claim 16, wherein an enclosure of the first set of enclosures or the second set of enclosures contains at least one of a movement sensor or a physiological sensor.

20. The wearable electronic device of claim 16, further comprising a communications module positioned in one of the first, second, third, or fourth enclosures.

* * * * *